United States Patent
Yamazaki et al.

[11] Patent Number: 5,899,828
[45] Date of Patent: May 4, 1999

[54] ENGINE PUMPING LOSS CONTROL APPARATUS FOR LOCKING INTAKE OR EXHAUST VALVES FULL OPEN DURING REGENERATIVE BRAKING HYBRID VEHICLE

[75] Inventors: Suehiro Yamazaki, Susono; Kaoru Ohtsuka, Misima; Takahide Izutani, Susono, all of Japan

[73] Assignee: Toyota Jidosha Kabushiki Kaisha, Toyota, Japan

[21] Appl. No.: 08/867,664

[22] Filed: Jun. 3, 1997

[30] Foreign Application Priority Data

Jun. 14, 1996 [JP] Japan .................................. 8-175635

[51] Int. Cl.⁶ .................................................. B60L 11/00
[52] U.S. Cl. ............................ 477/4; 477/203; 477/21; 123/323
[58] Field of Search .................... 477/4, 21, 203, 477/205; 123/321, 322, 325, 326; 701/22

[56] References Cited

U.S. PATENT DOCUMENTS

| 2,156,560 | 5/1939 | Bachman | 477/205 |
| 3,621,929 | 11/1971 | Oberthur et al. | 477/203 X |
| 4,016,844 | 4/1977 | Tanaka et al. | 477/203 |
| 4,020,455 | 4/1977 | Irimajiri et al. | 477/203 |
| 4,779,589 | 10/1988 | Matsuura et al. | 123/323 X |
| 5,680,641 | 10/1997 | Hu | 123/321 X |
| 5,725,064 | 3/1998 | Ibaraki et al. | 701/21 X |
| 5,730,675 | 3/1998 | Yamaguchi | 477/4 X |
| 5,746,175 | 5/1998 | Hu | 123/322 |

FOREIGN PATENT DOCUMENTS

A-59-100941 6/1984 Japan .

*Primary Examiner*—Khol Q. Ta
*Attorney, Agent, or Firm*—Oliff & Berridge, PLC

[57] ABSTRACT

An engine control apparatus for a hybrid vehicle reduces a shock and improves the fuel consumption rate when an engine is under a fuel cut control at the time of reducing a speed through an operation of a brake pedal. In case that all conditions are fulfilled, that is, the fuel cut control, the speed reduction of not less than a predetermined level, and the non-full charge state of a battery, the program locks an intake valve and an exhaust valve in full open position and carries out a regenerative control with a generator 14. This procedure enables a cylinder to be connected with an intake air conduit and an exhaust conduit via the passages of the intake valve and the exhaust valve, thereby preventing compression of a gas in the cylinder and effectively reducing friction.

17 Claims, 12 Drawing Sheets

ENGINE PUMPING LOSS CONTROL APPARATUS FOR LOCKING INTAKE OR EXHAUST VALVES FULL OPEN DURING REGENERATIVE BRAKING HYBRID VEHICLE

BACKGROUND OF THE INVENTION

1. Field of the Invention

The present invention relates to an engine control apparatus for a hybrid vehicle with an engine and a motor for driving the vehicle mounted thereon. More specifically the present invention pertains to an engine control apparatus under a fuel cut control that is carried out at the time of speed reduction, for example, through a braking operation.

2. Description of the Related Art

In an engine mounted on a vehicle, a fuel cut control that temporarily cuts a supply of fuel injected into the engine is generally carried out at the time of speed reduction, for example, through a braking operation, in order to improve the fuel consumption rate as well as emission of the gaseous exhausts. The fuel cut control under the speed reduction causes an abrupt decrease in output of the engine, which results in an abrupt increase in frictions including a pumping loss. The increased frictions enhance engine brake and may damage a good ride.

A technique disclosed in JAPANESE PATENT LAYING-OPEN GAZETTE No. 59-100941 has been proposed to above such problems. The prior art technique utilizes an atmospheric air introduction passage, which bypasses a throttle valve and is arranged in an intake air conduit, and a control valve arranged in the atmospheric air introduction passage, and opens the control valve under the fuel cut control. Connection of a cylinder with the atmospheric air introduction passage by opening the control valve under the fuel cut control enables a piston to go up and down in the total volume of the cylinder, thereby reducing the pumping loss.

The prior art technique has the effect of reducing the pumping loss while an intake valve and an exhaust valve are open. In case that both the intake valve and the exhaust valve are closed, however, the air is compressed and expanded in only the volume of the cylinder. This causes a large pumping loss, which enhances engine brake and may damage a good ride. While the intake valve and the exhaust valve are closed, the compression and expansion of the air in the cylinder increases the temperature of the gas in the cylinder, thereby causing a cooling loss.

A hybrid vehicle, on which an engine and a motor work in combination, has been proposed and expected to improve the fuel consumption rate and the emission characteristics of the gaseous exhausts. It is required to solve the above problems under the fuel cut control in such a hybrid vehicle.

SUMMARY OF THE INVENTION

The object of the present invention is thus to provide an engine control apparatus for a hybrid vehicle that reduces a pumping loss to keep a good ride and improve the fuel consumption rate when a fuel cut control is carried out at the time of requirement for speed reduction, for example, through a braking operation.

At least part of the above and the other related objects is realized by an engine control apparatus for a hybrid vehicle, which includes an engine and a motor that are connected with a drive shaft linked with wheels to actuate the drive shaft by at least one of outputs of the engine and the motor.

The engine control apparatus includes: a generator for generating electric power by utilizing regenerative energy transmitted from the wheels; an intake valve arranged at an intake opening for introducing the air from an intake conduit of the engine into a cylinder; an exhaust valve arranged at an exhaust opening for discharging an exhaust gas from the cylinder to an exhaust conduit; intake and exhaust valves driving means for turning on and off the intake valve and the exhaust valve according to a driving condition of the engine, while locking the intake valve and the exhaust valve in full open position according to a requirement; braking requirement detecting means detecting a braking requirement of the vehicle has been output; fuel cut control means for, when the braking requirement detecting means detects the braking requirement, carrying out a fuel cut control to temporarily cut a supply of fuel into the cylinder; and valves and power generation control means for, when the fuel cut control means carries out the fuel cut control, controlling the intake and exhaust valves driving means to lock the intake valve and the exhaust valve in full open position and enabling the generator to generate electric power with regenerative energy transmitted from the drive shaft.

The hybrid vehicle according to the present invention is driven by at least one of the outputs of the motor and the engine. The hybrid vehicle can be driven only by the driving force of the motor, and the engine is thus set more frequently under a fuel cut control, which temporarily cuts a supply of fuel, at the time of speed reduction, for example, through a braking operation, compared with the engine mounted on the normal vehicle. This effectively improves the fuel consumption rate. Simultaneously with the fuel cut control, the valves and power generation control means controls the intake and exhaust valves driving means to lock the intake valve and the exhaust valve in full open position, while enabling the generator to generate electric power with the regenerative energy transmitted from the wheels.

In case that the intake valve and the exhaust valve are kept in full open position under the fuel cut control of the engine, the cylinder is connected to the intake conduit and the exhaust conduit via the intake opening of the intake valve and the exhaust opening of the exhaust valve. This structure enables the air to be compressed in the total volume of the cylinder, the intake conduit, and the exhaust conduit. The increase in volume decreases the compression and expansion resistance and thereby reduces the energy loss due to frictions including a pumping loss of the engine. The energy that is not absorbed by the engine is utilized as the regenerative energy transmitted from the wheels by the generator to generate electric power.

The electric power generated by the generator may be stored in a storage battery or supplied to other electrical appliances mounted on the hybrid vehicle. The output of the generator can be increased or decreased continuously for a smooth braking force. This structure effectively prevents a poor ride due to an abrupt decrease in output of the engine under the fuel cut control.

In case that the engine has a throttle valve in the intake conduit, simultaneously with the fuel cut control, an additional control for opening the throttle valve is carried out to add the volume of the intake conduit before the throttle valve to the total volume of the cylinder, the intake conduit after the throttle valve, and the exhaust conduit and enable a piston to move up and down in the increased volume. This further reduces the friction of the engine.

In the above structure, the valves and power generation control means controls the intake and exhaust valves driving means to lock the intake valve and the exhaust valve in full open position, when the fuel cut control is carried out at the time of requirement for a braking operation. In accordance with another preferable application, the valves and power generation control means controls the intake and exhaust valves driving means to elongate an overlap period, in which the intake valve and the exhaust valve are simultaneously open. In this structure, the longer overlap period shortens a time period, in which the cylinder is sealed by the intake valve and the exhaust valve, thereby reducing the friction of the engine and increasing the regenerative electric power by the generator corresponding to the decrease in friction.

The hybrid vehicle may further be provided with braking requirement detecting means for detecting a step-on amount of a brake pedal. The control of increasing the electric power generated by the generator according to the step-on amount of the brake pedal enables the efficient recovery of regenerative energy, thereby further improving the fuel consumption rate.

In a preferable structure, a braking requirement of the vehicle is output in the step-on state of the brake pedal based on a detection signal of a brake switch and under the speed reduction of not less than a predetermined level. Alternatively the braking requirement of the vehicle may be output either in the step-on state of the brake pedal based on the detection signal of the brake switch or under the speed reduction of not less than a predetermined level.

The valves and power generation control means enables a storage battery to be charged with the electric power generated by the generator, only when the remaining charge of the storage battery measured by remaining charge detection means is less than a predetermined level. This structure effectively prevents the storage battery from being excessively charged.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
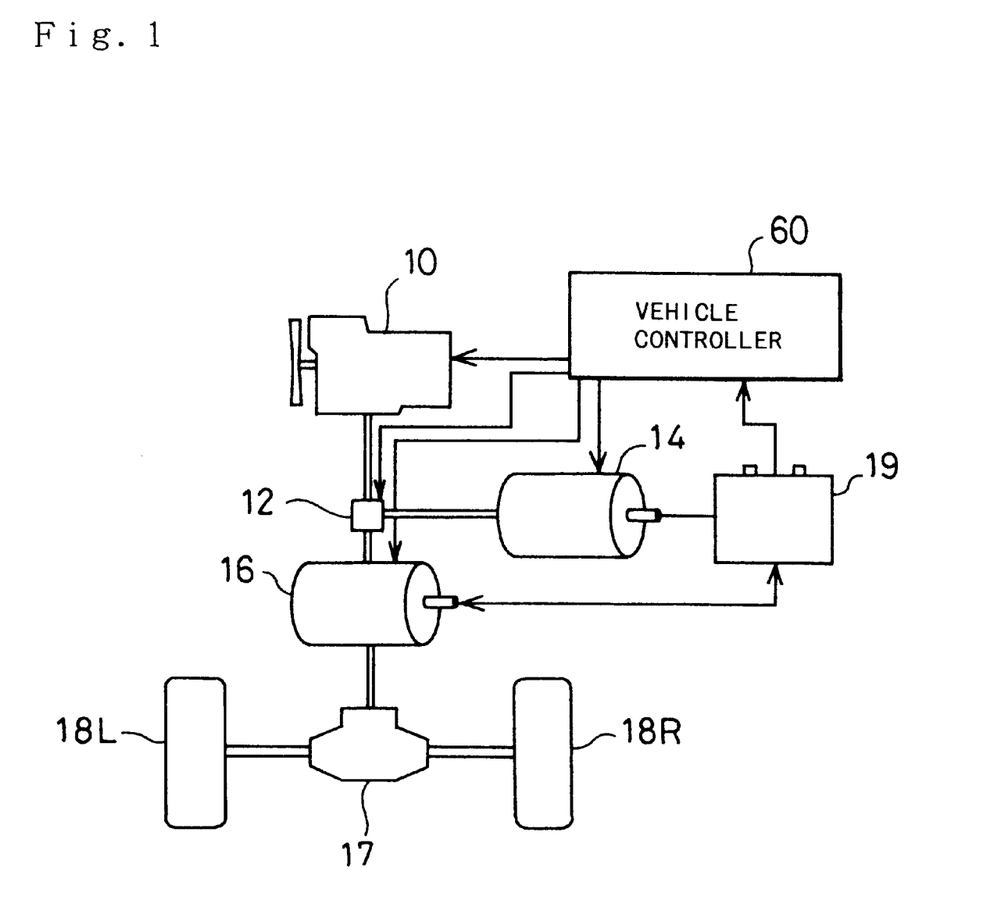
FIG. 1 schematically illustrates a hybridvehicle, on which an engine embodying the present invention is mounted.

As shown in FIG. 1, the hybrid vehicle adopts a mechanical distribution system, in which engine output is distributed by a planetary gear unit 12, in order to drive driving wheels 18R,18L directly and actuate a generator 14, thereby driving a motor 16 with the electric power thus generated. The hybrid vehicle is provided with an engine 10 that receives a supply of fuel from a fuel tank (not shown) and is driven with the supplied fuel. An output shaft of the engine 10 is connected with the planetary gear unit 12. The planetary gear unit 12 has a plurality of input/output shafts connected with the engine 10 and the motor 16 as well as the generator 14. Rotational motion of the output shaft of the engine 10 is transmitted to either one of or both the generator 14 and the motor 16 via the planetary gear unit 12. An output shaft of the motor 16 is connected to a differential gear 17 and eventually linked with driving wheels 18R and 18L of the vehicle. The generator 14 is connected to a battery 19. The battery 19 is charged with the electric power output from the generator 14 and is discharged to supply the motor 16 with the electric power.

Figure 2:
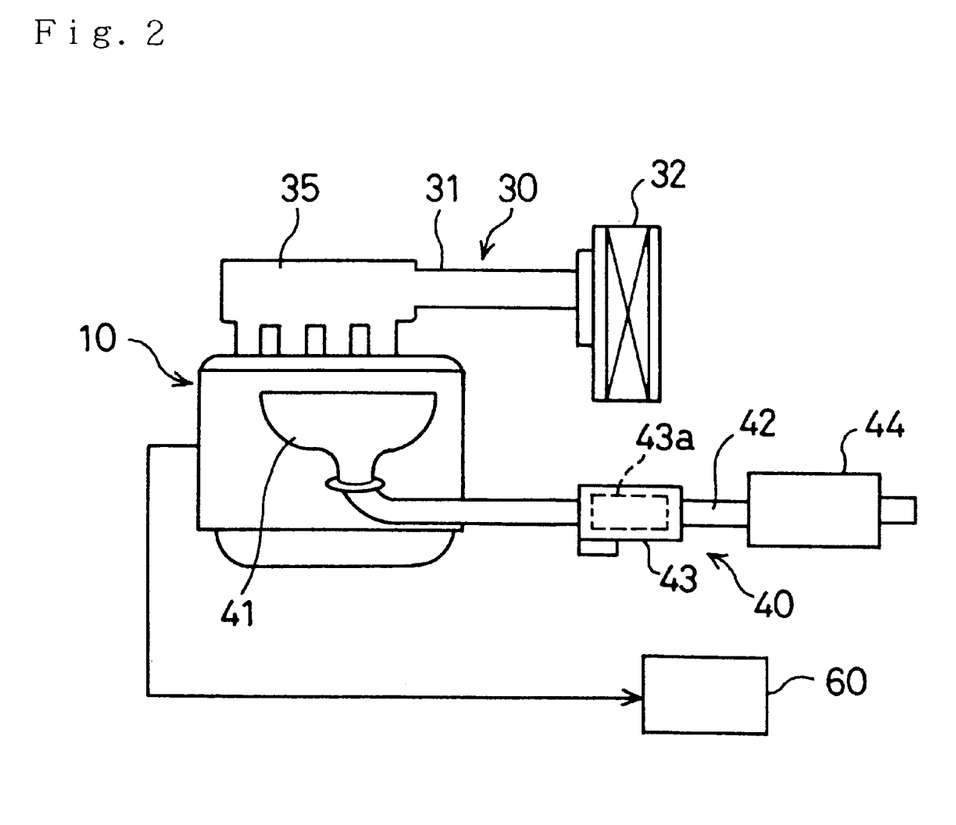
FIG. 2 schematically shows the exterior of the engine.
Figure 3:
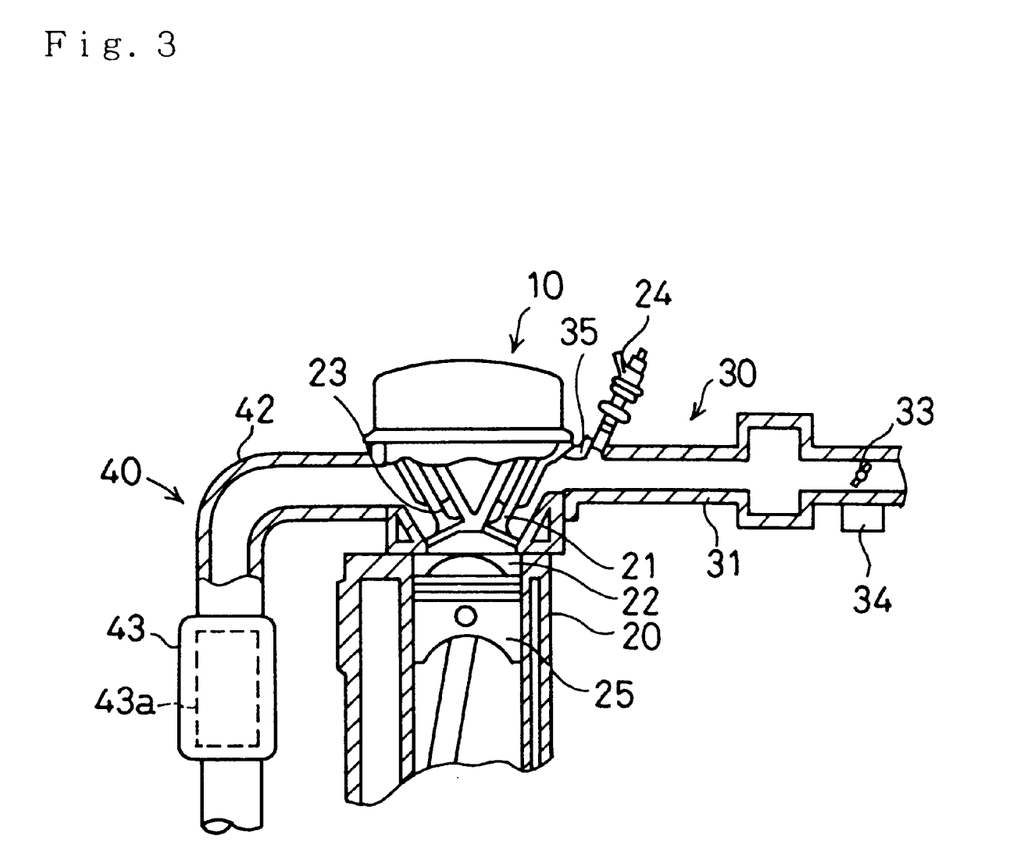
FIG. 3 is a cross sectional view schematically illustrating the engine.

As shown in FIG. 2 and 3, the engine 10 is a gasoline engine driven with gasoline, and includes an intake system 30 arranged before a cylinder 20 and an exhaust system 40 arranged after the cylinder 20. The intake system 30 includes an intake air conduit 31, an air cleaner 32 arranged before the intake air conduit 31, a throttle valve 33 disposed inside the intake air conduit 31, a throttle valve motor 34 for driving on and off the throttle valve 33, and an intake manifold 35 connected after the intake air conduit 31. The intake system 30 is connected to a combustion chamber 22 in the cylinder 20 via an intake valve 21.

The exhaust system 40 includes an exhaust manifold 41 connecting with the cylinder 20 via an exhaust valve 23, an exhaust conduit 42 connected to the exhaust manifold 41, a catalytic converter 43 that is attached to the exhaust conduit 42 and has a catalyst 43a for converting gaseous exhausts, and a muffler 44 disposed after the catalytic converter 43. The catalyst 43a is a three-way catalyst that simultaneously converts hydrocarbons, carbon monoxide, and nitrogen oxides included in the gaseous exhausts and is activated to realize a high conversion ratio in a temperature range of not lower than 350° C.

Figure 4:
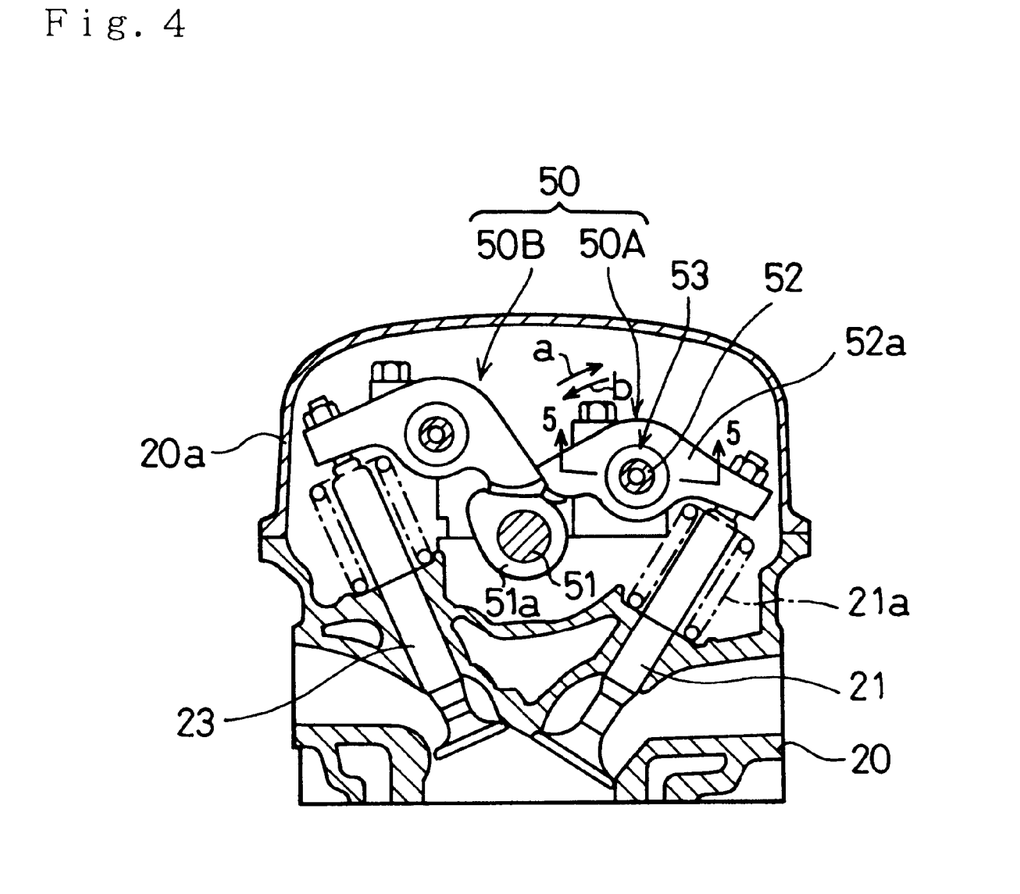
FIG. 4 shows a valve operating mechanism 50 arranged on the upper portion of the cylinder 20.

The engine 10 is further provided with a valve operating mechanism 50 for turning on and off the intake valve 21 and the exhaust valve 23, which is shown in FIG. 4. The valve operating mechanism 50 turns on and off the intake valve 21 and the exhaust valve 23 in response to a rotation of the crankshaft of the engine 10, while locking the intake valve 21 and the exhaust valve 23 in full open position whenever required.

FIG. 4 shows the valve operating mechanism 50 arranged on the upper portion of the cylinder 20. An intake valve driving unit 50A and an exhaust valve driving unit 50B of the valve operating mechanism 50 respectively turn on and off the intake valve 21 and the exhaust valve 23. These units 50A and 50B have identical structures, and the following accordingly describes the intake valve driving unit 50A as an example.

The intake valve driving unit 50A includes a cam shaft 51 arranged above a cylinder head 20a, a cam 51a fixed to the cam shaft 51, a rocker shaft 52 arranged off to the upper of the cam shaft 51, and a rocker arm 52a supported by the rocker shaft 52 to freely swing around the rocker shaft 52. The rocker arm 52a has one end fixed to the upper end of the intake valve 21 and the other end coming into contact with the cam 51a. A press of the cam 51a causes the rocker arm 52a to swing around the rocker shaft 52. This configuration enables the rocker arm 52a to swing in the directions 'a' and 'b' by the rotation of the cam 51a fixed to the cam shaft 51. The swing of the rocker arm 52a in the direction 'a' makes the intake valve 21 open against a valve spring 21a. The swing of the rocker arm 52a in the direction 'b', on the other hand, causes the intake valve 21 to be pressed and closed by the valve spring 21a.

Figure 5:
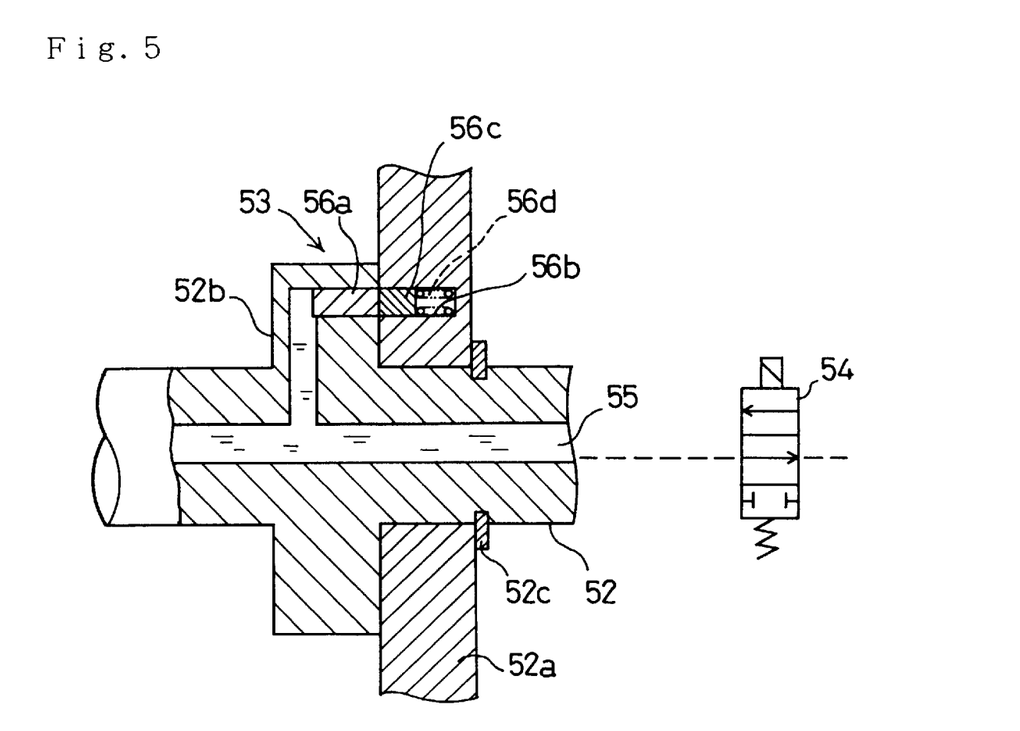
FIG. 5 shows an unlocked state of a lock mechanism 53 included in the valve operating mechanism 50.
Figure 6:
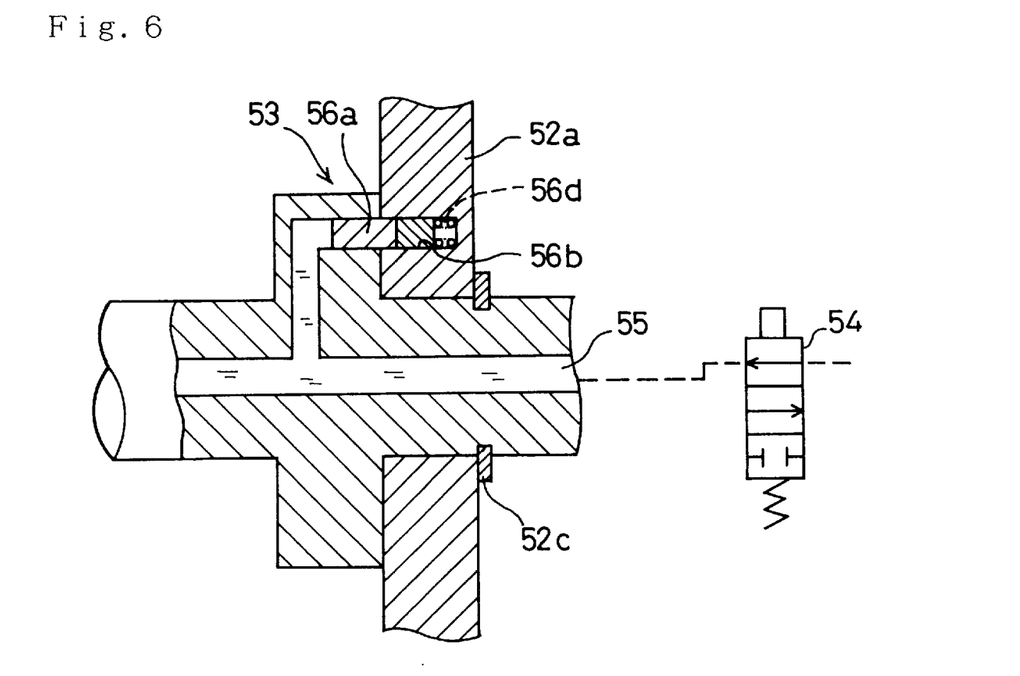
FIG. 6 shows a locked state of the lock mechanism 53 included in the valve operating mechanism 50.

The intake valve driving unit 50A is further provided with a lock mechanism 53 for locking the swing of the rocker arm 52a, which is shown in FIGS. 5 and 6. FIGS. 5 and 6 are cross sectional views schematically illustrating the portion taken on the line 5—5 of FIG. 4. FIGS. 5 and 6 respectively show an unlocked state and a locked state of the lock mechanism 53.

As discussed above, the rocker arm 52a is supported by the rocker shaft 52 to allow free swings thereof. The center portion of the rocker arm 52a is supported by a fringe 52b and a washer 52c of the rocker shaft 52.

The lock mechanism 53 includes a control valve 54 connected to an oil hydraulic pump (not shown), an oil path 55 connected to the control valve 54 and formed in the rocker shaft 52 and the fringe 52b, a rocker pin 56a inserted into one end portion of the oil path 55, an aperture 56b formed in a side face of the rocker arm 52a to receive the rocker pin 56a, a support bar 56c set in the aperture 56b, and a rocker spring 56d for pressing the rocker pin 56a via the support bar 56c.

The lock mechanism 53 functions in the following manner. In case that the control valve 54 is kept in OFF position in response to a control signal output from a vehicle controller 60 (discussed later) as shown in FIG. 5, the oil pressure supplied from the oil hydraulic pump is not applied to an end face of the rocker pin 56a of the lock mechanism 53 via the oil path 55. The rocker pin 56a is accordingly pressed by the rocker spring 56d and does not work to link the rocker shaft 52 with the rocker arm 52a. This results in the unlock state, in which the swing of the rocker arm 52a is not restricted. The rocker arm 52a swings with the rotation of the cam shaft 51 transmitted via the cam 51a, so as to turn on and off the intake valve.

In case that the control valve 54 is kept in ON position as shown in FIG. 6, on the contrary, the oil pressure supplied from the oil hydraulic pump is applied to the end face of the rocker pin 56a via the control valve 54 and the oil path 55. The rocker pin 56a accordingly works against the pressing force of the rocker spring 56d and is inserted into the aperture 56b formed in the rocker arm 52a. The insertion makes the rocker pin 56a work to link the rocker shaft 52 with the rocker arm 52a and restricts the swing of the rocker arm 52a. This inhibits the opening and closing operations of the intake valve 21 and locks the intake valve 21 in full open position.

Figure 7:
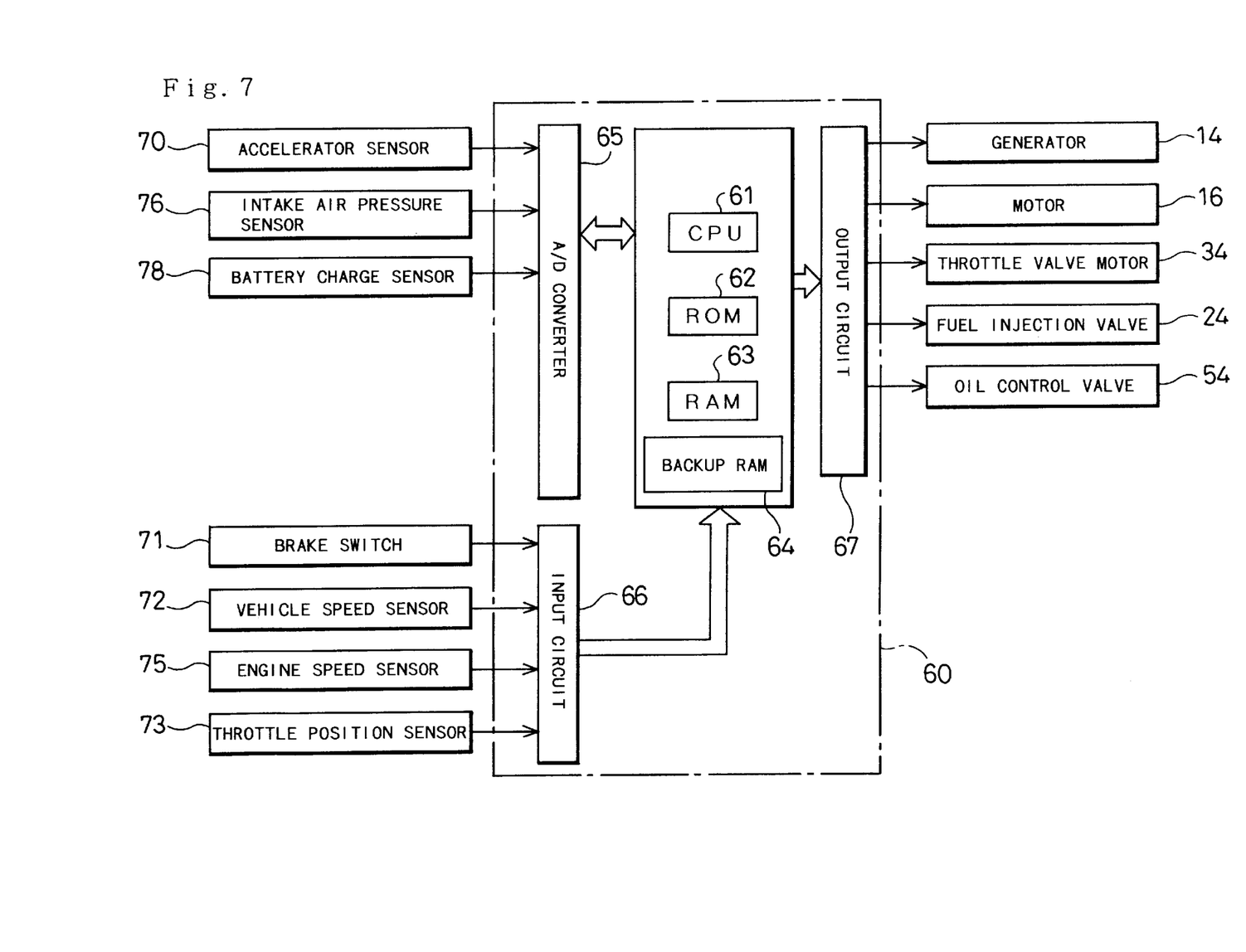
FIG. 7 is a block diagram showing a control system of the hybrid vehicle, which includes a vehicle controller 60.

The following describes the structure and function of the vehicle controller 60 for controlling the engine 10, the generator 14, and the motor 16. FIG. 7 is a block diagram showing a control system of the hybrid vehicle, which includes the vehicle controller 60.

The vehicle controller 60 is constructed as a logical operation circuit including a microcomputer. The vehicle controller 60 includes a CPU 61 for executing a variety of operations according to preset control programs, a ROM 62 in which control programs and control data required for the variety of operations by the CPU 61 are stored in advance, a RAM 63 which various data required for the variety of operations by the CPU 61 are temporarily written in and read from, a backup RAM 64 for keeping data in a power-off state, an A/D converter 65 and an input circuit 66 for receiving vehicle information, and an output circuit 67 for outputting driving signals to the throttle valve motor 34 of the engine 10, various actuators including the control valve 54 of the valve operating mechanism 50, and the generator 14 based on the results of operations by the CPU 61.

The vehicle controller 60 reads output signals and data of sensors and switches for detecting various pieces of vehicle information, and carries out the required control. The sensors and switches connected to the vehicle controller 60 include an accelerator sensor 70 for measuring a step-on amount of an accelerator pedal by a driver, a brake switch 71 for detecting the working state of a brake, a vehicle speed sensor 72 for measuring the vehicle speed, a throttle position sensor 73 for measuring a throttle position of the throttle valve 33, an engine speed sensor 75 for measuring the revolving speed of the engine 10, an intake air pressure sensor 76 for measuring the pressure in the intake air conduit 31, and a battery charge sensor 78 for measuring the amount of charge in the battery 19. These sensors and switches are electrically connected to the A/D converter 65 and the input circuit 66, so that the vehicle controller 60 can receive information on the vehicle.

The following describes the control operations carried out by the vehicle controller 60 thus constructed. The vehicle controller 60 controls the engine 10, the generator 14, and the motor 16 based on the step-on amount of the accelerator pedal and the vehicle speed. In accordance with a concrete procedure, the vehicle controller 60 calculates a required output for the axle based on the step-on amount of the accelerator pedal and the vehicle speed, and adds an amount of charge into the battery 19 to the required output for the axle or alternatively subtracts an amount of discharge from the battery 19 from the required output for the axle, so as to determine a required engine power. The vehicle controller 60 then drives the engine 10 and enables the required engine power to be transmitted directly to the driving wheels 18R and 18L via the planetary gear unit 12. The vehicle controller 60 also supplies the electric power output from the generator 14 to the motor 16 or charges the battery 19 with the electric power.

The vehicle controller 60 carries out a fuel cut control for temporarily cutting a supply of fuel to the engine 10 in an active braking state, so as to improve the fuel consumption rate. In the course of the fuel cut control, the vehicle controller 60 also executes a routine of valves on-off and power generation control to set the intake valve 21 and the exhaust valve 23 in full open position, thereby reducing the friction torque and enabling the regenerative control with the generator 14.

Figure 8:
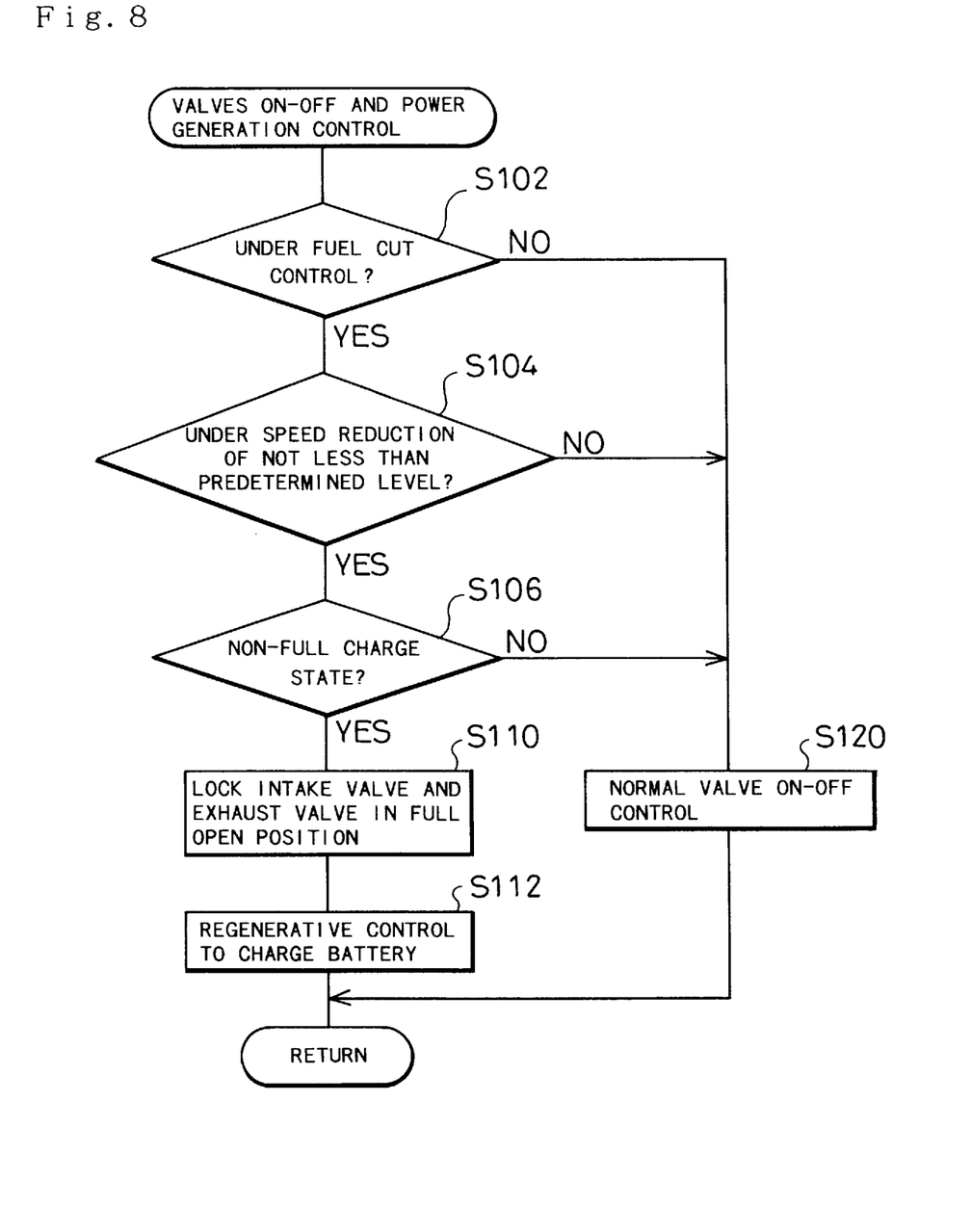
FIG. 8 is a flowchart showing a routine of valves on-off and power generation control executed in the first embodiment.

FIG. 8 is a flowchart showing the routine of valves on-off and power generation control executed in the first embodiment. In the flowchart of FIG. 8, when the answer is affirmative at all the decision points S102 through S106, the program locks the intake valve 21 and the exhaust valve 23 in full open position at step S110 and charges the battery 19 with the electric power generated by the generator 14 at step S112. In case that any one of the conditions is not fulfilled at steps S102 through S106, on the other hand, the program carries out the normal operation at step S120 to turn on and off the intake valve 21 and the exhaust valve 23 at the timing in linkage with the rotation of the crankshaft.

In accordance with a concrete procedure, at step S102, it is determined whether or not the fuel cut control is being carried out. The determination is based on a fuel cut flag, which is set and reset in another routine. The fuel cut flag is set when the detection signal of the vehicle speed sensor 72 represents a predetermined or higher engine speed and the throttle position sensor 73 detects a full close state of the throttle valve 33. The fuel cut control enables the engine 10 to be driven in a motoring state, in which combustion of the air/fuel mixture is not carried out.

At subsequent step S104, it is determined whether or not the current state is a speed reduction state of a predetermined or greater level. The speed reduction state represents a braking state, in which the brake switch 71 is kept ON, and is realized when the detection signal of the vehicle speed sensor 72 implies speed reduction of a predetermined or greater level. This prevents the procedure of applying a braking force accompanied with the power generation of the generator 14 (discussed later), even when the fuel cut control is carried out in the normal stable driving condition.

At step S106, it is determined whether or not the battery 19 is in full charge state, based on the detection signal of the battery charge sensor 78. In case that the battery 19 is in full charge state, the program does not carry out the processing of step S112, which charges the battery 19 with the electric power generated by the generator 14.

When all the conditions are fulfilled at steps S102 through S106, the program proceeds to step S110 to output a signal to the control valve 54 of the valve operating mechanism 50, so as to lock the intake valve 21 and the exhaust valve 23 in full open position. The program then goes to step S112 to carry out the regenerative control with the generator 14. The regenerative control changes the transmission path of the power of the planetary gear 12, in order to make the generator 14 carry out power generation with the driving force from the driving wheels 18R and 18L, and regulates the electric power output from the generator 14.

In case that any one of the conditions is not fulfilled at steps S102 through S106, on the contrary, the program proceeds to step S120 to output a signal to the control valve 54 of the valve operating mechanism 50, so as to return the intake valve 21 and the exhaust valve 23 to the normal state.

In the routine of valves on-off and power generation control shown in FIG. 8, the engine 10 is under the fuel cut control at the time of speed reduction, such as in an active braking state, while the valve operating mechanism 50 functions to lock the intake valve 21 and the exhaust valve 23 in full open position. The lock of the intake valve 21 and the exhaust valve 23 in full open position enables the cylinder 20 to be connected with the intake air conduit 31 and the exhaust conduit 42 via the passages of the intake valve 21 and the exhaust valve 23, over the whole stroke of the engine 10.

The full open state of the intake valve 21 and the exhaust valve 23 effectively reduces frictions including a pumping loss, because of the reason discussed below. It is assumed that the engine 10 is a four-cylinder engine, in which a first cylinder #1 and a fourth cylinder #4 have identical strokes while a second cylinder #2 and a third cylinder #3 have identical strokes. Namely the pistons of the first cylinder #1 and the fourth cylinder #4 go up while the pistons of the second cylinder #2 and the third cylinder #3 go down.

In case that the pistons go up in the first cylinder #1 and the fourth cylinder #4 to press a gas out of the cylinders #1 and #4, the gas flows through the intake manifold 35 and the exhaust manifold 41 into the second cylinder #2 and the third cylinder #3, in which the pistons are going down. This structure prevents the gas from being sealed and compressed in the first cylinder #1 and the fourth cylinder #4. While the pistons go up in the second cylinder #2 and the third cylinder #3, on the contrary, the gas is absorbed by the first cylinder #1 and the fourth cylinder #4. The gas flow between different cylinders prevents the gas from being compressed in one cylinder 20, thereby reducing the frictions including a pumping loss.

The energy saved by the engine 10 is converted to electric power by the generator 14. The energy transmitted from the driving wheels 18R and 18L is absorbed by the power generation of the generator 14 and functions as an engine brake, thereby not damaging the braking performance. The electrical control continuously converts the electric power generated by the generator 14, thus realizing a smooth braking operation and keeping a good ride. The battery 19 is charged with the electric power output from the generator 14. This structure effectively utilizes the regenerative energy produced at the time of speed reduction of the vehicle, thereby improving the fuel consumption rate.

Figure 9:
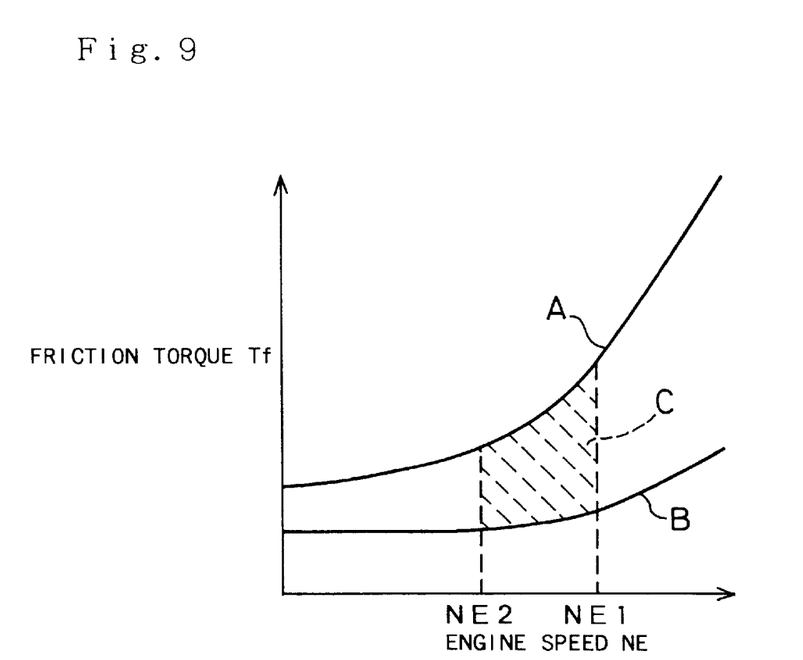
FIG. 9 is a graph showing the relationship between the engine speed NE and the friction torque Tf in the first embodiment.

FIG. 9 is a graph showing the relationship between the engine speed NE and the friction torque Tf in the first embodiment. The curve A represents the state, in which the intake valve 21 and the exhaust valve 23 are turned on and off at the normal timing. The curve B represents the state, in which the valves full-open and power generation control of the embodiment is carried out to lock the intake valve 21 and the exhaust valve 23 in full open position. Referring to FIG. 9, compared with the curve A in the normal valves on-off control, the curve B in the valves-full open and power generation control has a smaller friction torque Tf over the whole range of the engine speed NE. The difference in friction torque Tf between the curves A and B increases with an increase in engine speed NE.

In case that the vehicle is in an active braking state and the engine speed NE decreases from NE1 to NE2, the loss due to the friction torque Tf decreases by an area C, and the decrease in energy is recovered by the power generation of the generator 14.

The control procedure has an additional effect of preventing the catalyst 43a from being cooled down. During the fuel cut control, combustion is not carried out in the engine 10 and the gas exhausted from the cylinder 20 has a relatively low temperature. A flow of the relatively low-temperature exhaust gas into the catalyst 43a cools down the catalyst 43a, so as to lower the conversion efficiency of the exhaust gas and worsen the emission. The structure of the embodiment carries out the valves-full open and power generation control. This enables a large portion of the relatively low-temperature exhaust gas to be circulated between the cylinders 20 and reduces the flow into the catalyst 43a. This structure accordingly prevents the catalyst 43a from being cooled down and maintains the desirable emission.

A preferable structure of the embodiment has a brake sensor for measuring a step-on amount of a brake pedal. The electric power generated by the generator increases with an increase in step-on amount of the brake pedal, which is given as a detection signal of the brake sensor. This structure does not consume the energy caused by the braking force of the brake but realizes the regenerative braking control through the power generation of the generator, while increasing the electric power generated by the generator and further improving the fuel consumption rate. The electric circuit continuously converts the amount of electric power generated by the generator, thereby keeping a good ride at the time of braking the vehicle.

An additional structure given to the above embodiment opens the throttle valve 33 simultaneously with the valves full-open and power generation control. In this case, the volume of the intake air conduit 31 before the throttle valve 33 is added to the total volume of the cylinder 20, the intake air conduit 31 after the throttle valve 33, and the exhaust conduit 42, thereby further reducing the pumping loss.

The following describes a valves on-off and power generation control executed in a second embodiment according to the present invention. In place of the control of locking the intake valve 21 and the exhaust valve 23 in full open position, the structure of the second embodiment utilizes a valve timing variable mechanism 90 shown in FIGS. 10 through 12 to set a longer overlap period, in which both an intake valve 21A and an exhaust valve 23A are open.

Figure 10:
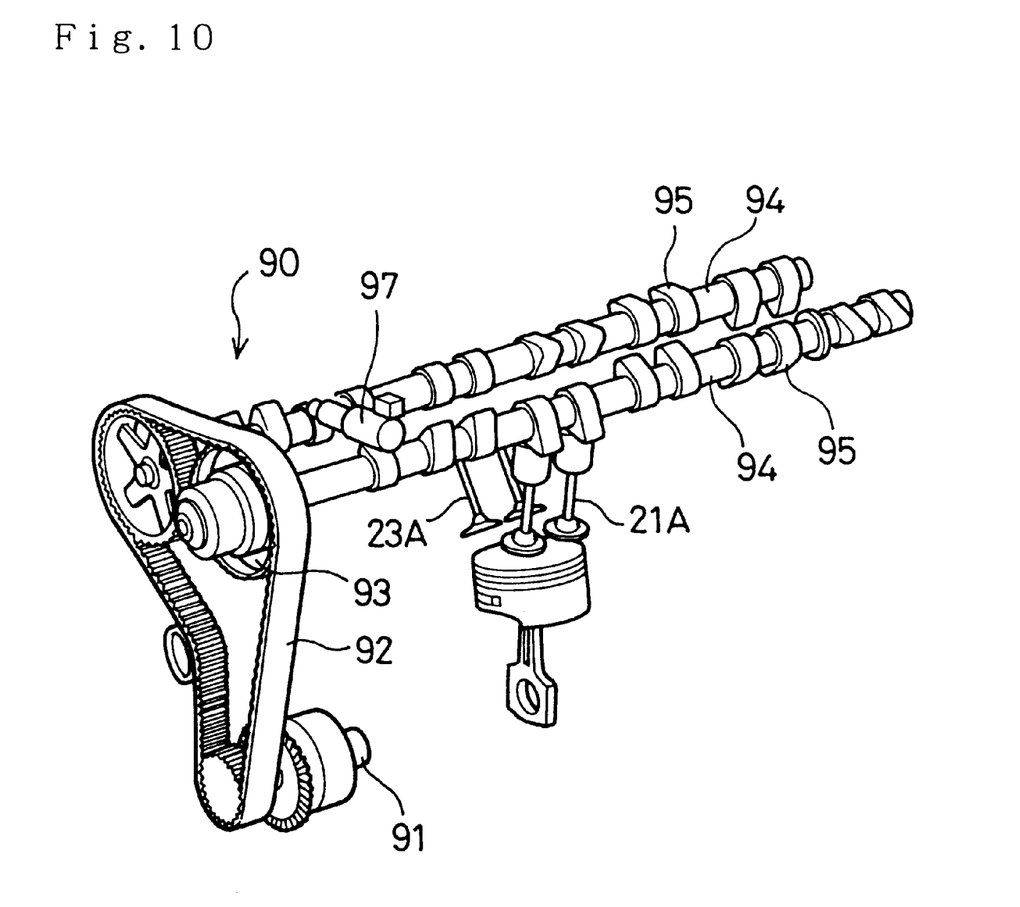
FIG. 10 is a perspective view illustrating a cam mechanism with a valve timing variable mechanism 90 used in a second embodiment according to the present invention.

FIG. 10 is a perspective view illustrating a cam mechanism with the valve timing variable mechanism 90 that can vary the overlap period, in which both the intake valve 21A and the exhaust valve 23A are in open position. The valve timing variable mechanism 90 is a known device having the functions of enhancing the engine power and improving the conversion efficiency of the gaseous exhausts. Referring to FIG. 10, when a timing belt 92 rotates with rotations of a crankshaft 91 of the engine 10, a cam shaft 94 in linkage with a pulley 93 rotates to give a pressing force to cams 95 and thereby open or close the intake valve 21A and the exhaust valve 23A. A phase shift of the cam shaft 94 to the pulley 93 in the direction of rotation regulates the overlap period of the intake valve 21A and the exhaust valve 23A.

Figure 11:
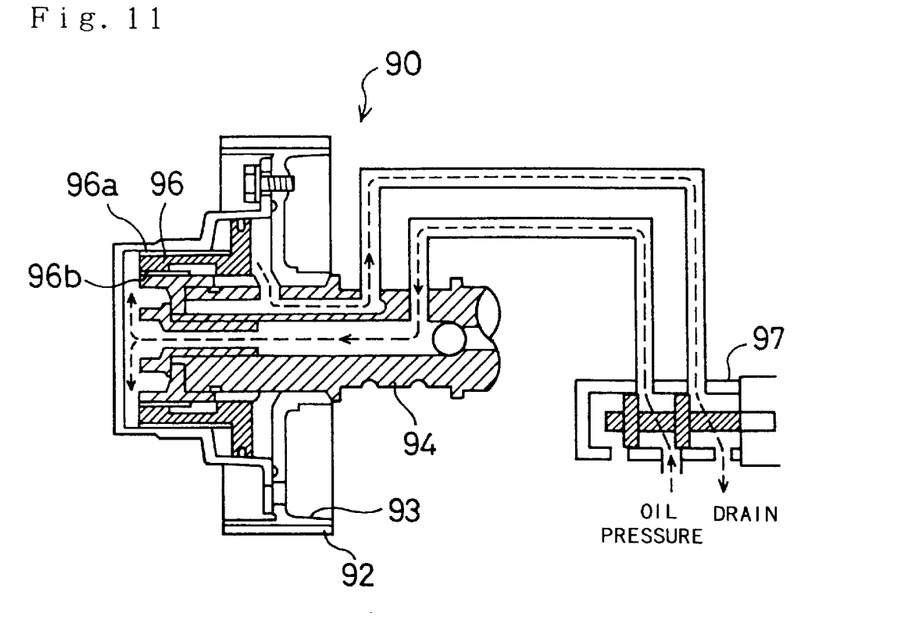
FIG. 11 shows operation of the valve timing variable mechanism 90.
Figure 12:
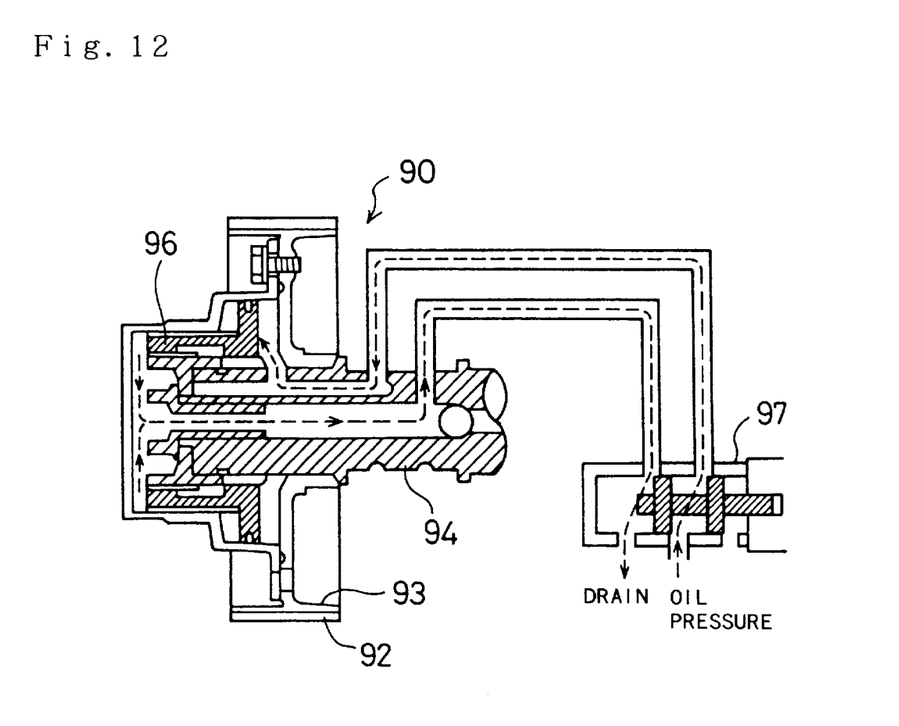
FIG. 12 shows operation of the valve timing variable mechanism 90.

FIGS. 11 and 12 are axial sectional views schematically illustrating the pulley 93 and the cam shaft 94. The valve timing variable mechanism 90 includes an oil hydraulic piston 96 interposed between the cam shaft 94 and the pulley 93. The oil hydraulic piston 96 has helical splines 96a and 96b on the inner and outer circumferences thereof, and moves along the axis when receiving an oil pressure supplied via a solenoid-operated oil control valve 97. The helical splines 96a and 96b then enable the cam shaft 94 and the pulley 93 to be rotated inversely relative to each other.

An electronic control unit (not shown) gives an instruction to switch the oil control valve 97, in order to increase or decrease the oil pressure and thereby move the oil hydraulic piston 96. When the electronic control unit gives an instruction to set the oil control valve 97 in the position shown in FIG. 11, the oil pressure flows along the arrows of FIG. 11 and moves the oil hydraulic piston 96 from left to right in the drawing. The distortion of the helical splines 96a and 96b formed on the oil hydraulic piston 96 moves the cam shaft 94 relative to the pulley 93 by a phase lead. When the electronic control unit gives an instruction to set the oil control valve 97 in the position shown in FIG. 12, on the other hand, the oil pressure flows along the arrows of FIG. 12 and moves the oil hydraulic piston 96 from right to left in the drawing. This enables the camshaft 94 to move by a phase delay. In case that the oil control valve 97 blocks the oil path, the oil hydraulic piston 96 is kept in the current position. The regulated oil pressure with the oil control valve 97 enables the cam shaft 94 and the pulley 93 to rotate relative to each other via the oil hydraulic piston 96 by a phase lead or a phase delay, thereby changing the overlap period.

Figure 13:
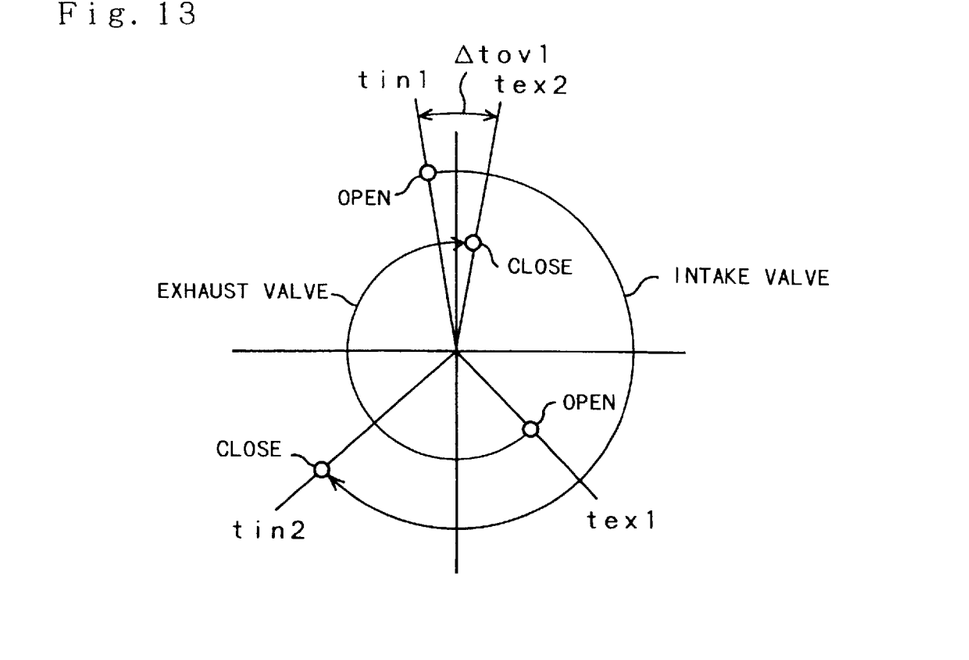
FIG. 13 shows opening and closing timing of the intake valve and the exhaust valve in the valve timing variable mechanism 90.
Figure 14:
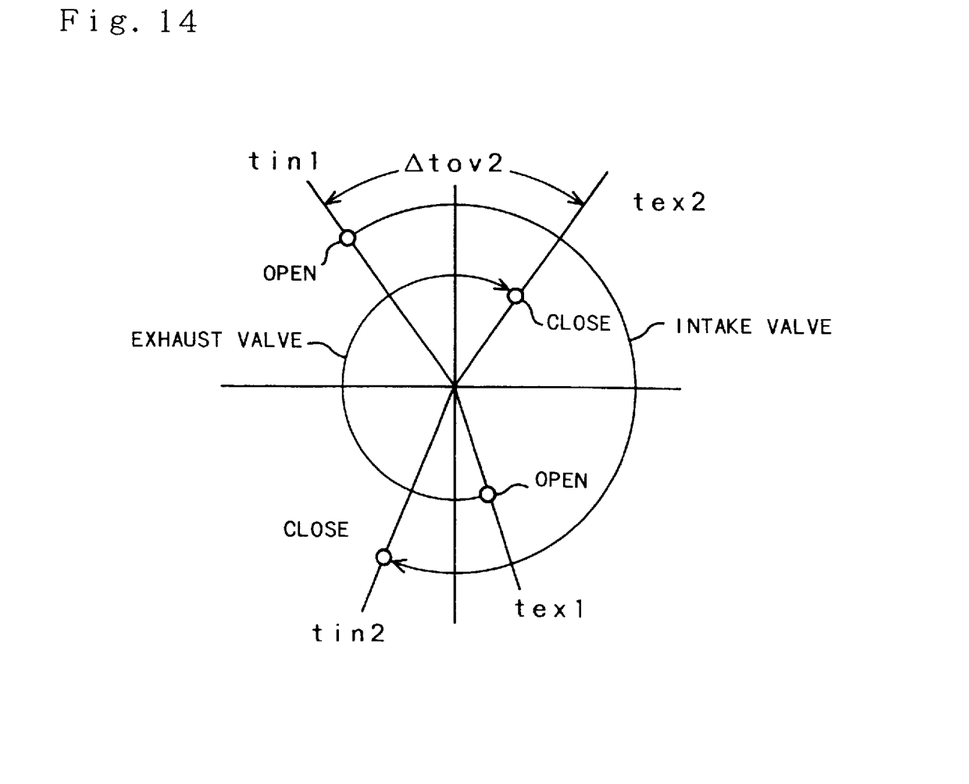
FIG. 14 hows the state of a longer overlap period than the overlap period of FIG. 13.

FIGS. 13 and 14 respectively show the opening and closing timing of the intake valve 21A and the exhaust valve 23A in the valve timing variable mechanism 90. FIG. 13 shows the state of a normal overlap period, whereas FIG. 14 shows the state of a longer overlap period. In the drawings of FIGS. 13 and 14, the intake valve 21A opens at a time point tin1 and closes at a time point tin2. The exhaust valve 23A, on the other hand, opens at a time point tex1 and closes at a time point tex2. Here $\Delta$tov1 and $\Delta$tov2 represent overlap periods. This embodiment carries out a control to lengthen the overlap period $\Delta$tov1 shown in FIG. 13 to the overlap period $\Delta$tov2 shown in FIG. 14.

Figure 15:
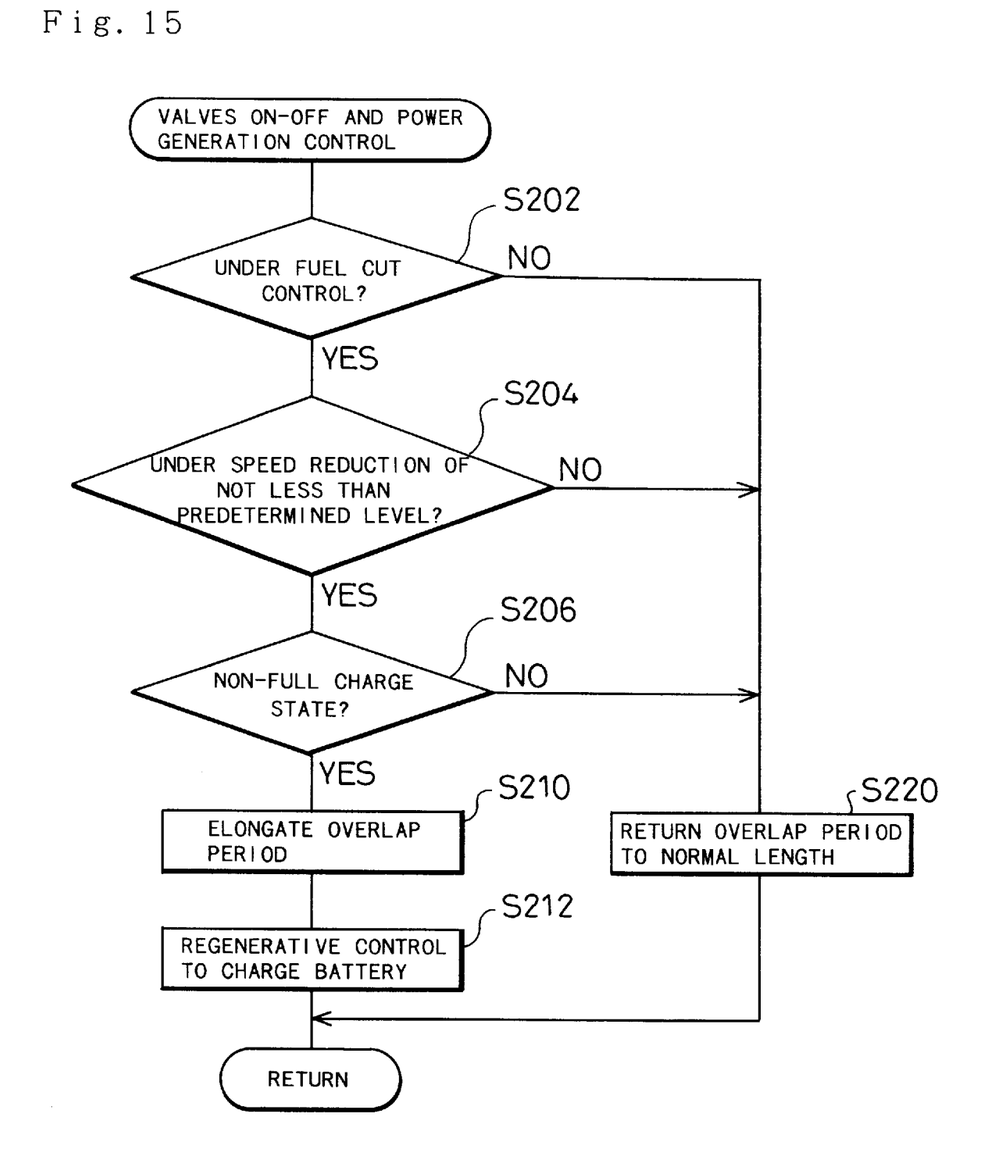
FIG. 15 is a flowchart showing a routine of valves on-off and power generation control executed in the second embodiment.

The flowchart of FIG. 15 shows the routine of valves on-off and power generation control with the valve timing variable mechanism 90. The flowchart of FIG. 15 is similar to the flowchart of FIG. 8, except the processing of steps S210 and S220. In the flowchart of FIG. 15, when all the conditions of the fuel cut control, the braking operation, and the non-full charge state are fulfilled at steps S202 through S206, the program actuates the valve timing variable mechanism 90 to length the overlap period at step S210 and carries out the regenerative control with the generator 14 at step S212. In case that any one of the conditions is not fulfilled at steps S202 through S206, on the other hand, the program returns the overlap period to the normal length at step S220.

Figure 16:
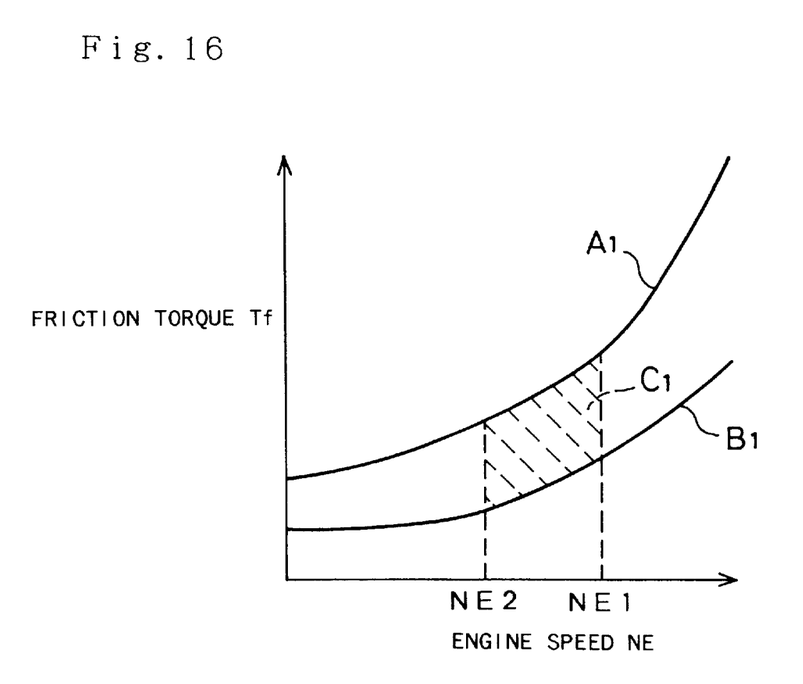
FIG. 16 is a graph showing the relationship between the engine speed NE and the friction torque Tf in the second embodiment.

In the processing of the second embodiment, in the motoring state of the engine 10 under the condition of speed reduction, the valve timing variable mechanism 90 elongates the overlap period $\Delta$tov, in which the intake valve 21A and the exhaust valve 23A are open simultaneously, thereby shortening the time period for sealing the cylinder 20. This lengthens the time period, in which the volume of the cylinder 20 is expanded to the volume including those of the intake air conduit 31 and the exhaust conduit 42, and accordingly decreases the compression and expansion resistance due to the shift of the piston. FIG. 16 is a graph showing the relationship between the engine speed NE and the friction torque Tf in the second embodiment, which corresponds to the graph of FIG. 9 in the first embodiment. In the control of the second embodiment, there is a time period, in which the piston is lifted up and down while the cylinder 20 is sealed, so that the curve B1 of FIG. 16 has a smaller effect of reducing the friction torque Tf than the curve B of FIG. 9. Compared with the curve A1 in the normal overlap period, however, the curve B1 in the longer overlap period has a smaller friction torque Tf over the whole range of the engine speed NE.

The above control procedure does not require any additional structure but can be implemented by the valve timing variable mechanism 90, which is conventionally used for improving the emission.

The present invention is not restricted to the above embodiments, but there may be many modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. An engine control apparatus for a hybrid vehicle, the hybrid vehicle having an engine, having a plurality of cylinders and a motor that are connected with a drive shaft linked with wheels, the drive shaft activated by at least one of outputs of the engine and the motor, the engine control apparatus comprising:

a generator for generating electric power using regenerative energy transmitted from the wheels;

an intake conduit of the engine for feeding air to each cylinder of the plurality of cylinders;

an intake valve arranged at an intake opening of each cylinder for introducing the air from the intake conduit into the cylinder;

an exhaust conduit of the engine for discharging exhaust gas from each cylinder of the plurality of cylinders;

an exhaust valve arranged at an exhaust opening of each cylinder for discharging the exhaust gas from the cylinder to the exhaust conduit;

intake valve and exhaust valve driving means for turning on and off either one of the intake valve and the exhaust valve of the cylinder according to a driving condition of the engine, and for locking at least one of the intake valve and the exhaust valve in a full open position according to a braking requirement;

braking requirement detecting means for detecting the braking requirement of the vehicle;

fuel cut control means for, when the braking requirement detecting means detects the braking requirement, carrying out a fuel cut control to temporarily cut a supply of fuel into the cylinder; and valves and power generation control means for, when the fuel cut control means carries out the fuel cut control, controlling the intake valve and exhaust valve driving means to lock the at least one of intake valve and the exhaust valve in the full open position and enabling the generator to generate electric power with regenerative energy transmitted from the drive shaft.

2. The engine control apparatus in accordance with claim 1, the engine control apparatus further comprising:

a throttle valve arranged in the intake conduit of the engine for regulating an amount of intake air introduced into the cylinder; and throttle valve regulating means for regulating a valve travel of the throttle valve, wherein the valves and power generation control means controls the throttle valve regulating means, in order to increase the valve travel of the throttle valve, while the fuel cut control means carries out the fuel cut control.

3. The engine control apparatus in accordance with claim 1, the engine control apparatus further comprising a storage battery which is charged with the electric power generated by the generator.

4. The engine control apparatus in accordance with claim 3, the engine control apparatus further comprising remaining charge detection means for measuring a remaining charge of the storage battery, wherein the valves and power generation control means enables the storage battery to be charged with the electric power generated by the generator, when the remaining charge measured by the remaining charge detection means is less than a predetermined level.

5. The engine control apparatus in accordance with claim 4, wherein the braking requirement detecting means detects a step-on amount of a brake pedal, and the valves and power generation control means increases the amount of electric power generated by the generator with an increase in the step-on amount of the brake pedal, based on the step-on amount detected by the braking requirement detecting means.

6. The engine control apparatus in accordance with claim 1, the engine control apparatus further comprising:

a brake switch for detecting a step-on state of a brake pedal; and vehicle speed detection means for detecting a speed reduction of the vehicle, wherein the braking requirement detecting means detects the braking requirement of the vehicle in the step-on state of the brake pedal and under the speed reduction of not less than a predetermined level.

7. The engine control apparatus in accordance with claim 1, the engine control apparatus further comprising mechanical distribution means connected to an output shaft of the engine for distributing a mechanical output accompanied by rotation of the output shaft into the generator and the drive shaft.

8. An engine control apparatus for a hybrid vehicle, the hybrid vehicle having an engine, having a plurality of cylinders, and a motor that are connected with a drive shaft linked with wheels, the drive shaft activated by at least one of outputs of the engine and the motor, the engine control apparatus comprising:

a generator for generating electric power using regenerative energy transmitted from the wheels;

an intake conduit of the engine for feeding air to each cylinder of the plurality of cylinders;

an intake valve arranged at an intake opening of each cylinder for introducing the air from the intake conduit into the cylinder;

an exhaust conduit of the engine for discharging exhaust gas from each cylinder of the plurality of cylinders;

an exhaust valve arranged at an exhaust opening of each cylinder for discharging the exhaust gas from the cylinder to the exhaust conduit;

intake valve and exhaust valve driving means for turning on and off either one of the intake valve and the exhaust valve of the cylinder, while varying an overlap period, in which the intake valve and the exhaust valve are open simultaneously;

braking requirement detecting means for detecting a braking requirement of the vehicle;

fuel cut control means for, when the braking requirement detecting means detects the braking requirement, carrying out a fuel cut control to temporarily cut a supply of fuel into the cylinder; and valves and power generation control means for, when the fuel cut control means carries out the fuel cut control, controlling the intake valve and exhaust valve driving means to lengthen the overlap period of the intake valve and the exhaust valve and enabling the generator to generate electric power with regenerative energy transmitted from the drive shaft.

9. The engine control apparatus in accordance with claim 8, the engine control apparatus further comprising:

a throttle valve arranged in the intake conduit of the engine for regulating an amount of intake air introduced into the cylinder; and throttle valve regulating means for regulating a valve travel of the throttle valve, wherein the valves and power generation control means controls the throttle valve regulating means, in order to increase the valve travel of the throttle valve, while the fuel cut control means carries out the fuel cut control.

10. The engine control apparatus in accordance with claim 8, the engine control apparatus further comprising a storage battery which is charged with the electric power generated by the generator.

11. The engine control apparatus in accordance with claim 10, the engine control apparatus further comprising remaining charge detection means for measuring a remaining charge of the storage battery, wherein the valves and power generation control means enables the storage battery to be charged with the electric power generated by the generator, when the remaining charge measured by the remaining charge detection means is less than a predetermined level.

12. The engine control apparatus in accordance with claim 11, wherein the braking requirement detecting means detects a step-on amount of a brake pedal, and the valves and power generation control means increases the amount of electric power generated by the generator with an increase in the step-on amount of the brake pedal, based on the step-on amount detected by the braking requirement detecting means.

13. The engine control apparatus in accordance with claim 8, the engine control apparatus further comprising:
   a brake switch for detecting a step-on state of a brake pedal; and
   vehicle speed detection means for detecting a speed reduction of the vehicle, wherein the braking requirement detecting means detects the braking requirement of the vehicle in the step-on state of the brake pedal and under the speed reduction of not less than a predetermined level.

14. The engine control apparatus in accordance with claim 8, the engine control apparatus further comprising mechanical distribution means connected to an output shaft of the engine for distributing a mechanical output accompanied by rotation of the output shaft into the generator and the drive shaft.

15. The engine control apparatus in accordance with claim 1, wherein both the intake valve and the exhaust valve of the cylinder are locked in a full open position.

16. An engine control apparatus for a hybrid vehicle, the hybrid vehicle having an engine, with a plurality of cylinders, and a motor connected with a drive shaft linked with driving wheels of the vehicle, the drive shaft activated by at least one of outputs of the engine and the motor, the engine control apparatus comprising:
   a generator that generates electric power using regenerative energy transmitted from the driving wheels;
   an intake conduit that feeds air to each cylinder of the plurality of cylinders of the engine;
   an intake valve at an intake opening of each cylinder that introduces air from the intake conduit into the cylinder;
   an exhaust conduit that discharges exhaust gases from each cylinder of the plurality of cylinders of the engine;
   an exhaust valve at an exhaust opening of each cylinder that exhausts the exhaust gases from the cylinder to the exhaust conduit;
   intake valve and exhaust valve driving means for turning on and off either one of the intake valve and the exhaust valve of the cylinder according to a driving condition of the engine and which controls the intake valve and the exhaust valve to be open simultaneously for at least a predetermined period in response to a braking requirement;
   braking requirement detecting means for detecting the braking requirement of the vehicle;
   fuel cut control means for, when the braking requirement detecting means detects the braking requirement, carrying out a fuel cut control to temporarily cut a supply of fuel into the cylinder; and
   valves and power generation control means for, when the fuel cut control means carries out the fuel cut control, controlling the intake valve and exhaust valve driving means to simultaneously open the intake valve and the exhaust valve and to lengthen the predetermined period, and enabling the generator to generate electric power with regenerative energy transmitted from the drive shaft.

17. The engine control apparatus in accordance with claim 16, further comprising locking means for locking the intake valve and the exhaust valve open.

* * * * *